United States Patent
Rao et al.

(10) Patent No.: US 10,552,734 B2
(45) Date of Patent: Feb. 4, 2020

(54) DYNAMIC SPATIAL TARGET SELECTION

(71) Applicant: QUALCOMM Incorporated, San Diego, CA (US)

(72) Inventors: Naveen Gandham Rao, San Diego, CA (US); Michael Campos, La Jolla, CA (US); Yinyin Liu, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 716 days.

(21) Appl. No.: 14/325,169

(22) Filed: Jul. 7, 2014

(65) Prior Publication Data
US 2015/0242746 A1   Aug. 27, 2015

Related U.S. Application Data

(60) Provisional application No. 61/943,231, filed on Feb. 21, 2014, provisional application No. 61/943,227, filed on Feb. 21, 2014.

(51) Int. Cl.
*G06N 3/08* (2006.01)

(52) U.S. Cl.
CPC ..................... *G06N 3/08* (2013.01)

(58) Field of Classification Search
CPC ............ G06N 3/049; G06N 3/02; G06N 3/08; G06N 3/063; G06N 3/10
See application file for complete search history.

(56) References Cited

U.S. PATENT DOCUMENTS

| | | | |
|---|---|---|---|
| 6,941,289 B2 | 9/2005 | Goodnight et al. | |
| 7,293,001 B1 | 11/2007 | Rai | |
| 7,324,979 B2 | 1/2008 | Butler et al. | |
| 7,483,868 B2 | 1/2009 | Meng et al. | |
| 7,949,428 B2 | 5/2011 | Endo et al. | |
| 8,126,828 B2 | 2/2012 | Snook et al. | |
| 8,332,070 B2 | 12/2012 | Glaeser et al. | |
| 8,364,311 B2 | 1/2013 | Heracles | |
| 8,583,286 B2 | 11/2013 | Fleischer et al. | |
| 2005/0047647 A1 | 3/2005 | Rutishauser et al. | |
| 2005/0261803 A1* | 11/2005 | Seth ......................... | G06F 3/015 700/245 |
| 2007/0282772 A1* | 12/2007 | Lee .......................... | G06N 3/02 706/25 |
| 2011/0022230 A1 | 1/2011 | Fleischer et al. | |

(Continued)

FOREIGN PATENT DOCUMENTS

| | | |
|---|---|---|
| CN | 102521653 A | 6/2012 |
| CN | 102906767 A | 1/2013 |

(Continued)

OTHER PUBLICATIONS

Alnajjar et al, A Simple Aplysia-Like Spiking Neural Network to Generate Adaptive Behavior in Autonomous Robots, 2008.*

(Continued)

*Primary Examiner* — Li B. Zhen
*Assistant Examiner* — Mikayla Chubb
(74) *Attorney, Agent, or Firm* — Seyfarth Shaw LLP

(57) ABSTRACT

A method of dynamically modifying target selection with a neural network includes dynamically modifying a selection function by controlling an amount of imbalance of connections in the neural network. A selected neuron represents one of multiple candidate targets.

30 Claims, 14 Drawing Sheets

(56) References Cited

U.S. PATENT DOCUMENTS

| | | | |
|---|---|---|---|
| 2012/0173471 A1 | 7/2012 | Ananthanarayanan et al. | |
| 2012/0271748 A1 | 10/2012 | Disalvo | |
| 2012/0316691 A1 | 12/2012 | Boardman et al. | |
| 2013/0073501 A1 | 3/2013 | Hunzinger et al. | |
| 2013/0204820 A1 | 8/2013 | Hunzinger et al. | |
| 2013/0331294 A1 | 12/2013 | Astsaturov et al. | |
| 2014/0052679 A1* | 2/2014 | Sinyavskiy | G06N 3/10 706/25 |
| 2015/0127149 A1* | 5/2015 | Sinyavskiy | B25J 9/163 700/250 |
| 2015/0178617 A1* | 6/2015 | Canoy | G06N 3/049 706/25 |
| 2015/0242742 A1 | 8/2015 | Rao | |

FOREIGN PATENT DOCUMENTS

| | | |
|---|---|---|
| CN | 103116354 A | 5/2013 |
| TW | 200849436 A | 12/2008 |
| WO | 2012130251 A1 | 10/2012 |

OTHER PUBLICATIONS

Arena et al, Visual learning in Drosophila: application on a roving robot and comparisons, 2011.*

Fiete et al, What Grid Cells Convey about Rat Location (Year: 2008).*

Cohen et al, Control of Automatic Processes (Year: 1989).*

Hirel et al, Biologically inspired neural networks for spatiotemporal planning in robotic navigation tasks (Year: 2011).*

Bakhtiari R., et al., "Computational Model of Excitatory/Inhibitory Ratio Imbalance Role in Attention Deficit Disorders", Journal of Computational Neuroscience, Kluwer Academic Publishers, BO, vol. 33, No. 2, May 8, 2012 (May 8, 2012), pp. 389-404, XP035111153, ISSN: 1573-6873, DOI: 10.1007/S10827-012-0391-Y, p. 389-p. 402, left-hand column.

International Search Report and Written Opinion—PCT/US2015/016693—ISA/EPO—dated Oct. 23, 2015.

Luz Y., et al., "Balancing Feed-Forward Excitation and Inhibition via Hebbian Inhibitory Synaptic Plasticity", Plos Computational Biology, vol. 8, No. 1, Jan. 26, 2012 (Jan. 26, 2012), pp. 1-12, XP055217244, DOI: 10.1371/journal.pcbi.1002334, p. 1-p. 11, right-hand column, paragraph 6.

Masquelier T., et al., "The Timing of Vision—How Neural Processing Links to Different Temporal Dynamics", Frontiers in Psychology, vol. 2, Jun. 30, 2011 (Jun. 30, 2011), pp. 1-14, XP055215989, DOI: 10.3389/fpsyg.2011.00151, p. 1-p. 12, right-hand column, paragraph 1.

Nere A., et al., "A Neuromorphic Architecture for Object Recognition and Motion Anticipation Using Burst-STDP", Plos One, vol. 7, No. 5, May 15, 2012 (May 15, 2012), pp. 1-17, XP055217288, DOI: 10.1371/journal.pone.0036958, p. 1-p. 15, right-hand column, paragraph 5.

Reevea., et al., "New technologies for testing a model of cricket phonotaxis on an outdoor robot", Robotics and Autonomous Systems, vol. 51, No. 1, Apr. 30, 2005, pp. 41-54.

Cutsuridis V., et al., "A Cognitive Control Architecture for the Perception-Action Cycle in Robots and Agents", Apr. 2013, pp. 383-395.

* cited by examiner

DYNAMIC SPATIAL TARGET SELECTION

CROSS-REFERENCE TO RELATED APPLICATION

This application claims the benefit under 35 U.S.C. § 119(e) to U.S. Provisional Patent Application No. 61/943,227, entitled "DYNAMIC SPATIAL TARGET SELECTION," filed on Feb. 21, 2014, and to U.S. Provisional Patent Application No. 61/943,231, entitled "IMBALANCED CROSS-INHIBITORY MECHANISM FOR SPATIAL TARGET SELECTION," filed on Feb. 21, 2014, the disclosure of which is expressly incorporated by reference herein in its entirety.

BACKGROUND

Field

Certain aspects of the present disclosure generally relate to neural system engineering and, more particularly, to systems and methods for dynamic spatial target selection.

Background

An artificial neural network, which may comprise an interconnected group of artificial neurons (i.e., neuron models), is a computational device or represents a method to be performed by a computational device. Artificial neural networks may have corresponding structure and/or function in biological neural networks. However, artificial neural networks may provide innovative and useful computational techniques for certain applications in which traditional computational techniques are cumbersome, impractical, or inadequate. Because artificial neural networks can infer a function from observations, such networks are particularly useful in applications where the complexity of the task or data makes the design of the function by conventional techniques burdensome. Thus, it is desirable to provide a neuromorphic receiver to dynamically select a target based on a selection scheme using an imbalanced cross-inhibitory mechanism.

SUMMARY

According to an aspect of the present disclosure, a method of dynamically modifying target selection with a neural network is disclosed. The method includes dynamically modifying a selection function by controlling an amount of imbalance of connections in the neural network. A selected neuron represents one of multiple candidate targets.

According to another aspect of the present disclosure, an apparatus is disclosed. The apparatus includes means for determining an amount of imbalance of connections in a neural network. The apparatus also includes means for dynamically modifying a selection function by controlling an amount of imbalance of connections in the neural network. A selected neuron represents one of multiple candidate targets.

Another aspect of the present disclosure is directed to an apparatus having a memory and at least one processor coupled to the memory. The processor(s) is configured to dynamically modify a selection function by controlling an amount of imbalance of connections in the neural network. A selected neuron represents one of multiple candidate targets.

In yet another aspect, a computer program product dynamically modifies target selection with a neural network. The computer readable medium has non-transitory program code recorded thereon which, when executed by the processor(s), causes the processor(s) to perform operations of dynamically modifying a selection function by controlling an amount of imbalance of connections in the neural network. A selected neuron represents one of multiple candidate targets.

Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method practiced using other structure, functionality, or structure and functionality in addition to or other than the various aspects of the disclosure set forth. It should be understood that any aspect of the disclosure disclosed may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses or objectives. Rather, aspects of the disclosure are intended to be broadly applicable to different technologies, system configurations, networks and protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Neural System, Training and Operation

Figure 1:
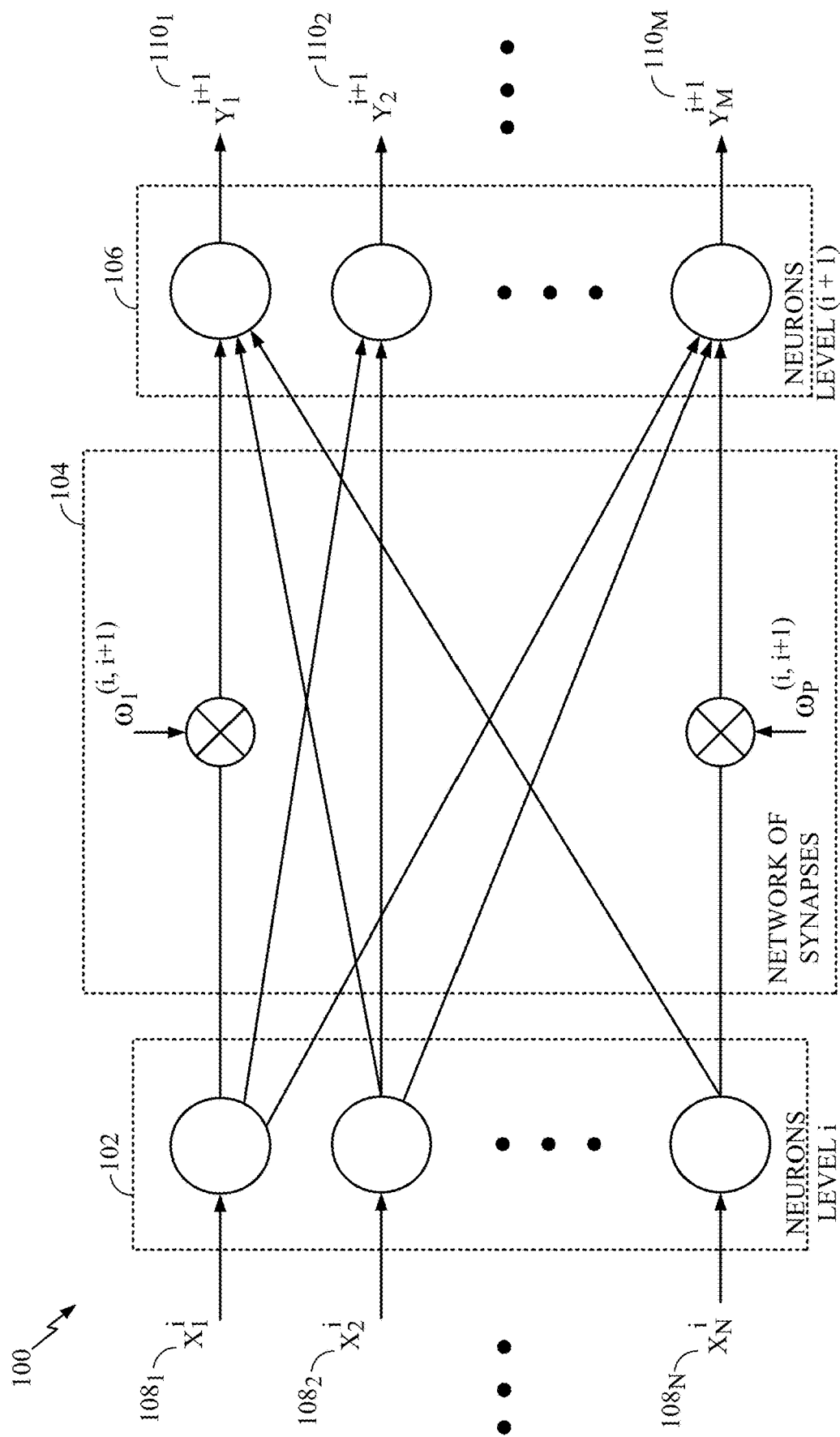
FIG. 1 illustrates an example network of neurons in accordance with certain aspects of the present disclosure.

FIG. 1 illustrates an example artificial neural system 100 with multiple levels of neurons in accordance with certain aspects of the present disclosure. The neural system 100 may have a level of neurons 102 connected to another level of neurons 106 through a network of synaptic connections 104 (i.e., feed forward connections). For simplicity, only two levels of neurons are illustrated in FIG. 1, although fewer or more levels of neurons may exist in a neural system. It should be noted that some of the neurons may connect to other neurons of the same layer through lateral connections. Furthermore, some of the neurons may connect back to a neuron of a previous layer through feedback connections.

As illustrated in FIG. 1, each neuron in the level 102 may receive an input signal 108 that may be generated by neurons of a previous level (not shown in FIG. 1). The signal 108 may represent an input current of the level 102 neuron. This current may be accumulated on the neuron membrane to charge a membrane potential. When the membrane potential reaches its threshold value, the neuron may fire and generate an output spike to be transferred to the next level of neurons (e.g., the level 106). In some modeling approaches, the neuron may continuously transfer a signal to the next level of neurons. This signal is typically a function of the membrane potential. Such behavior can be emulated or simulated in hardware and/or software, including analog and digital implementations such as those described below.

In biological neurons, the output spike generated when a neuron fires is referred to as an action potential. This electrical signal is a relatively rapid, transient, nerve impulse, having an amplitude of roughly 100 mV and a duration of about 1 ms. In a particular embodiment of a neural system having a series of connected neurons (e.g., the transfer of spikes from one level of neurons to another in FIG. 1), every action potential has basically the same amplitude and duration, and thus, the information in the signal may be represented only by the frequency and number of spikes, or the time of spikes, rather than by the amplitude. The information carried by an action potential may be determined by the spike, the neuron that spiked, and the time of the spike relative to other spike or spikes. The importance of the spike may be determined by a weight applied to a connection between neurons, as explained below.

The transfer of spikes from one level of neurons to another may be achieved through the network of synaptic connections (or simply "synapses") 104, as illustrated in FIG. 1. Relative to the synapses 104, neurons of level 102 may be considered presynaptic neurons and neurons of level 106 may be considered postsynaptic neurons. The synapses 104 may receive output signals (i.e., spikes) from the level 102 neurons (i and scale those signals according to adjustable synaptic weights $w_1^{(i,i+1)}, \ldots, w_P^{(i,i+1)}$ where P is a total number of synaptic connections between the neurons of levels 102 and 106 and i is an indicator of the neuron level. In the example of FIG. 1, i represents neuron level 102 and i+1 represents neuron level 106. Further, the scaled signals may be combined as an input signal of each neuron in the level 106. Every neuron in the level 106 may generate output spikes 110 based on the corresponding combined input signal. The output spikes 110 may be transferred to another level of neurons using another network of synaptic connections (not shown in FIG. 1).

Biological synapses can mediate either excitatory or inhibitory (hyperpolarizing) actions in postsynaptic neurons and can also serve to amplify neuronal signals. Excitatory signals depolarize the membrane potential (i.e., increase the membrane potential with respect to the resting potential). If enough excitatory signals are received within a certain time period to depolarize the membrane potential above a threshold, an action potential occurs in the postsynaptic neuron. In contrast, inhibitory signals generally hyperpolarize (i.e., lower) the membrane potential. Inhibitory signals, if strong enough, can counteract the sum of excitatory signals and prevent the membrane potential from reaching a threshold. In addition to counteracting synaptic excitation, synaptic inhibition can exert powerful control over spontaneously active neurons. A spontaneously active neuron refers to a neuron that spikes without further input, for example due to its dynamics or a feedback. By suppressing the spontaneous generation of action potentials in these neurons, synaptic inhibition can shape the pattern of firing in a neuron, which is generally referred to as sculpturing. The various synapses 104 may act as any combination of excitatory or inhibitory synapses, depending on the behavior desired.

The neural system 100 may be emulated by a general purpose processor, a digital signal processor (DSP), an application specific integrated circuit (ASIC), a field programmable gate array (FPGA) or other programmable logic device (PLD), discrete gate or transistor logic, discrete hardware components, a software module executed by a processor, or any combination thereof. The neural system 100 may be utilized in a large range of applications, such as image and pattern recognition, machine learning, motor control, and alike. Each neuron in the neural system 100 may be implemented as a neuron circuit. The neuron membrane charged to the threshold value initiating the output spike may be implemented, for example, as a capacitor that integrates an electrical current flowing through it.

In an aspect, the capacitor may be eliminated as the electrical current integrating device of the neuron circuit, and a smaller memristor element may be used in its place. This approach may be applied in neuron circuits, as well as in various other applications where bulky capacitors are utilized as electrical current integrators. In addition, each of the synapses 104 may be implemented based on a memristor element, where synaptic weight changes may relate to changes of the memristor resistance. With nanometer feature-sized memristors, the area of a neuron circuit and synapses may be substantially reduced, which may make implementation of a large-scale neural system hardware implementation more practical.

Functionality of a neural processor that emulates the neural system 100 may depend on weights of synaptic connections, which may control strengths of connections between neurons. The synaptic weights may be stored in a non-volatile memory in order to preserve functionality of the processor after being powered down. In an aspect, the synaptic weight memory may be implemented on a separate external chip from the main neural processor chip. The synaptic weight memory may be packaged separately from the neural processor chip as a replaceable memory card. This may provide diverse functionalities to the neural processor, where a particular functionality may be based on synaptic weights stored in a memory card currently attached to the neural processor.

Figure 2:
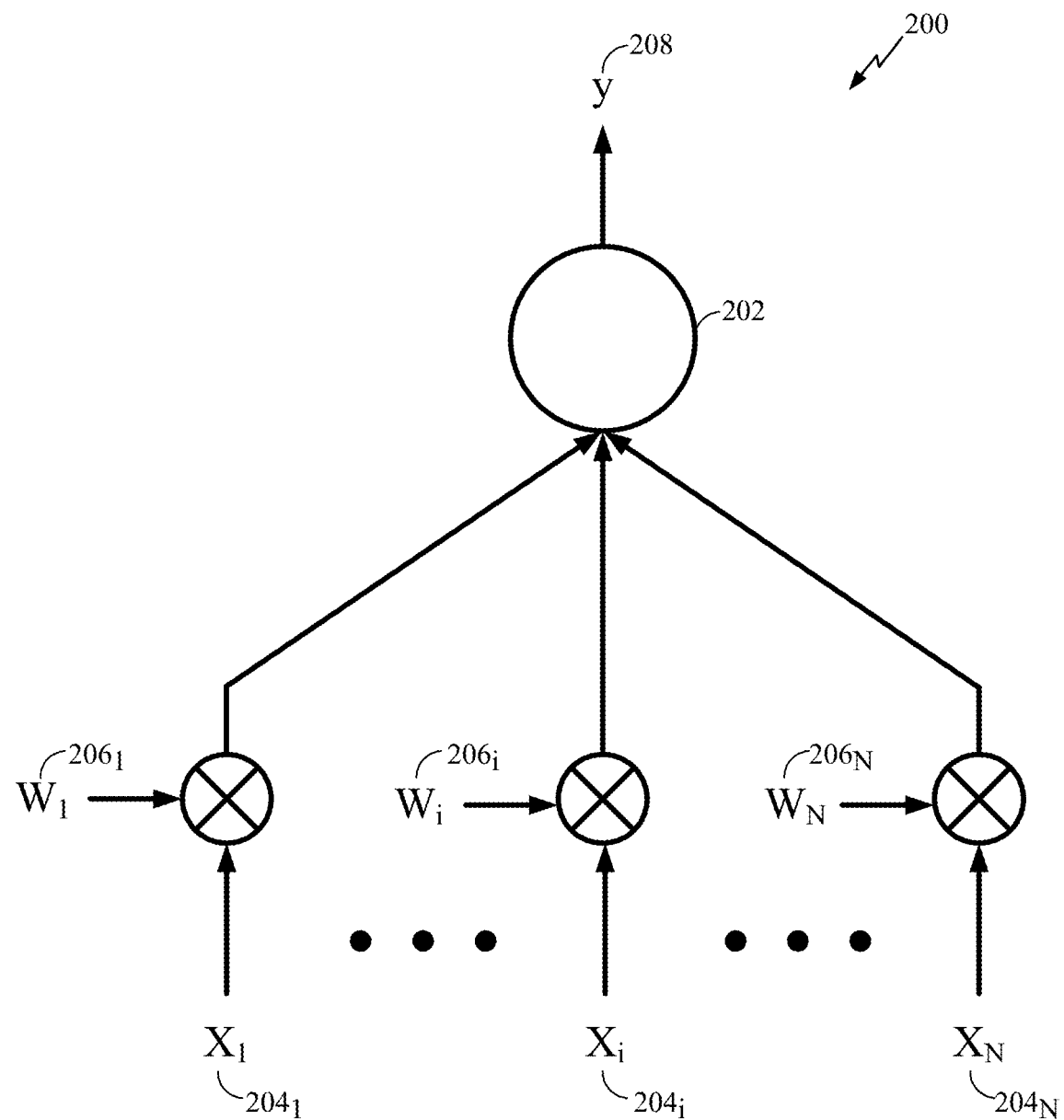
FIG. 2 illustrates an example of a processing unit (neuron) of a computational network (neural system or neural network) in accordance with certain aspects of the present disclosure.

FIG. 2 illustrates an exemplary diagram 200 of a processing unit (e.g., a neuron or neuron circuit) 202 of a computational network (e.g., a neural system or a neural network) in accordance with certain aspects of the present disclosure. For example, the neuron 202 may correspond to any of the neurons of levels 102 and 106 from FIG. 1. The neuron 202 may receive multiple input signals $204_1$-$204_N$, which may be signals external to the neural system, or signals generated by other neurons of the same neural system, or both. The input signal may be a current, a conductance, a voltage, a real-valued, and/or a complex-valued. The input signal may comprise a numerical value with a fixed-point or a floating-point representation. These input signals may be delivered to the neuron 202 through synaptic connections that scale the signals according to adjustable synaptic weights $206_1$-$206_N$ ($W_1$-$W_N$), where N may be a total number of input connections of the neuron 202.

The neuron 202 may combine the scaled input signals and use the combined scaled inputs to generate an output signal 208 (i.e., a signal Y). The output signal 208 may be a current, a conductance, a voltage, a real-valued and/or a complex-valued. The output signal may be a numerical value with a fixed-point or a floating-point representation. The output signal 208 may be then transferred as an input signal to other neurons of the same neural system, or as an input signal to the same neuron 202, or as an output of the neural system.

The processing unit (neuron) 202 may be emulated by an electrical circuit, and its input and output connections may be emulated by electrical connections with synaptic circuits. The processing unit 202 and its input and output connections may also be emulated by a software code. The processing unit 202 may also be emulated by an electric circuit, whereas its input and output connections may be emulated by a software code. In an aspect, the processing unit 202 in the computational network may be an analog electrical circuit. In another aspect, the processing unit 202 may be a digital electrical circuit. In yet another aspect, the processing unit 202 may be a mixed-signal electrical circuit with both analog and digital components. The computational network may include processing units in any of the aforementioned forms. The computational network (neural system or neural network) using such processing units may be utilized in a large range of applications, such as image and pattern recognition, machine learning, motor control, and the like.

During the course of training a neural network, synaptic weights (e.g., the weights $w_1^{(i,i+1)}, \ldots, w_P^{(i,i+1)}$ from FIG. 1 and/or the weights $206_1$-$206_N$ from FIG. 2) may be initialized with random values and increased or decreased according to a learning rule. Those skilled in the art will appreciate that examples of the learning rule include, but are not limited to the spike-timing-dependent plasticity (STDP) learning rule, the Hebb rule, the Oja rule, the Bienenstock-Copper-Munro (BCM) rule, etc. In certain aspects, the weights may settle or converge to one of two values (i.e., a bimodal distribution of weights). This effect can be utilized to reduce the number of bits for each synaptic weight, increase the speed of reading and writing from/to a memory storing the synaptic weights, and to reduce power and/or processor consumption of the synaptic memory.

Synapse Type

In hardware and software models of neural networks, the processing of synapse related functions can be based on synaptic type. Synapse types may be non-plastic synapses (no changes of weight and delay), plastic synapses (weight may change), structural delay plastic synapses (weight and delay may change), fully plastic synapses (weight, delay and connectivity may change), and variations thereupon (e.g., delay may change, but no change in weight or connectivity). The advantage of multiple types is that processing can be subdivided. For example, non-plastic synapses may not require plasticity functions to be executed (or waiting for such functions to complete). Similarly, delay and weight plasticity may be subdivided into operations that may operate together or separately, in sequence or in parallel. Different types of synapses may have different lookup tables or formulas and parameters for each of the different plasticity types that apply. Thus, the methods would access the relevant tables, formulas, or parameters for the synapse's type.

There are further implications of the fact that spike-timing dependent structural plasticity may be executed independently of synaptic plasticity. Structural plasticity may be executed even if there is no change to weight magnitude (e.g., if the weight has reached a minimum or maximum value, or it is not changed due to some other reason) s structural plasticity (i.e., an amount of delay change) may be a direct function of pre-post spike time difference. Alternatively, structural plasticity may be set as a function of the weight change amount or based on conditions relating to bounds of the weights or weight changes. For example, a synapse delay may change only when a weight change occurs or if weights reach zero but not if they are at a maximum value. However, it may be advantageous to have independent functions so that these processes can be parallelized reducing the number and overlap of memory accesses.

Determination of Synaptic Plasticity

Neuroplasticity (or simply "plasticity") is the capacity of neurons and neural networks in the brain to change their synaptic connections and behavior in response to new information, sensory stimulation, development, damage, or dysfunction. Plasticity is important to learning and memory in biology, as well as for computational neuroscience and neural networks. Various forms of plasticity have been studied, such as synaptic plasticity (e.g., according to the Hebbian theory), spike-timing-dependent plasticity (STDP), non-synaptic plasticity, activity-dependent plasticity, structural plasticity and homeostatic plasticity.

STDP is a learning process that adjusts the strength of synaptic connections between neurons. The connection strengths are adjusted based on the relative timing of a particular neuron's output and received input spikes (i.e., action potentials). Under the STDP process, long-term potentiation (LTP) may occur if an input spike to a certain neuron tends, on average, to occur immediately before that neuron's output spike. Then, that particular input is made somewhat stronger. On the other hand, long-term depression (LTD) may occur if an input spike tends, on average, to occur immediately after an output spike. Then, that particular input is made somewhat weaker, and hence the name "spike-timing-dependent plasticity." Consequently, inputs that might be the cause of the postsynaptic neuron's excitation are made even more likely to contribute in the future, whereas inputs that are not the cause of the postsynaptic spike are made less likely to contribute in the future. The process continues until a subset of the initial set of connections remains, while the influence of all others is reduced to an insignificant level.

Because a neuron generally produces an output spike when many of its inputs occur within a brief period (i.e., being cumulative sufficient to cause the output), the subset of inputs that typically remains includes those that tended to be correlated in time. In addition, because the inputs that occur before the output spike are strengthened, the inputs that provide the earliest sufficiently cumulative indication of correlation will eventually become the final input to the neuron.

The STDP learning rule may effectively adapt a synaptic weight of a synapse connecting a presynaptic neuron to a postsynaptic neuron as a function of time difference between spike time $t_{pre}$ of the presynaptic neuron and spike time $t_{post}$ of the postsynaptic neuron (i.e., $t=t_{post}-t_{pre}$). A typical formulation of the STDP is to increase the synaptic weight (i.e., potentiate the synapse) if the time difference is positive (the presynaptic neuron fires before the postsynaptic neuron), and decrease the synaptic weight (i.e., depress the synapse) if the time difference is negative (the postsynaptic neuron fires before the presynaptic neuron).

In the STDP process, a change of the synaptic weight over time may be typically achieved using an exponential decay, as given by:

$$\Delta w(t) = \begin{cases} a_+ e^{-t/k_+} + \mu, & t > 0 \\ a_- e^{t/k_-}, & t < 0 \end{cases} \quad (1)$$

where $k_+$ and $k_-\tau_{sign(\Delta t)}$ are time constants for positive and negative time difference, respectively, $a_+$ and $a_-$ are corresponding scaling magnitudes, and $\mu$ is an offset that may be applied to the positive time difference and/or the negative time difference.

Figure 3:
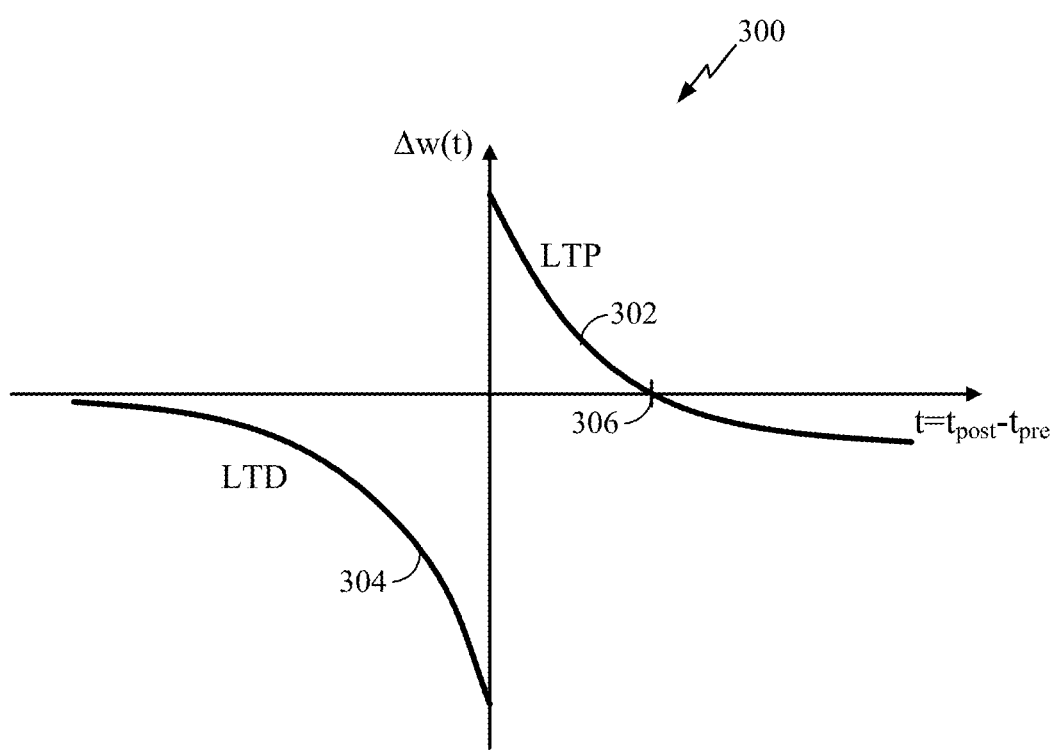
FIG. 3 illustrates an example of spike-timing dependent plasticity (STDP) curve in accordance with certain aspects of the present disclosure.

FIG. 3 illustrates an exemplary diagram 300 of a synaptic weight change as a function of relative timing of presynaptic and postsynaptic spikes in accordance with the STDP. If a presynaptic neuron fires before a postsynaptic neuron, then a corresponding synaptic weight may be increased, as illustrated in a portion 302 of the graph 300. This weight increase can be referred to as an LTP of the synapse. It can be observed from the graph portion 302 that the amount of LTP may decrease roughly exponentially as a function of the difference between presynaptic and postsynaptic spike times. The reverse order of firing may reduce the synaptic weight, as illustrated in a portion 304 of the graph 300, causing an LTD of the synapse.

As illustrated in the graph 300 in FIG. 3, a negative offset $\mu$ may be applied to the LTP (causal) portion 302 of the STDP graph. A point of cross-over 306 of the x-axis (y=0) may be configured to coincide with the maximum time lag for considering correlation for causal inputs from layer i−1. In the case of a frame-based input (i.e., an input that is in the form of a frame of a particular duration comprising spikes or pulses), the offset value $\mu$ can be computed to reflect the frame boundary. A first input spike (pulse) in the frame may be considered to decay over time either as modeled by a postsynaptic potential directly or in terms of the effect on neural state. If a second input spike (pulse) in the frame is considered correlated or relevant to a particular time frame, then the relevant times before and after the frame may be separated at that time frame boundary and treated differently in plasticity terms by offsetting one or more parts of the STDP curve such that the value in the relevant times may be different (e.g., negative for greater than one frame and positive for less than one frame). For example, the negative offset $\mu$ may be set to offset LTP such that the curve actually goes below zero at a pre-post time greater than the frame time and it is thus part of LTD instead of LTP.

Neuron Models and Operation

There are some general principles for designing a useful spiking neuron model. A good neuron model may have rich potential behavior in terms of two computational regimes: coincidence detection and functional computation. Moreover, a good neuron model should have two elements to allow temporal coding: arrival time of inputs affects output time and coincidence detection can have a narrow time window. Finally, to be computationally attractive, a good neuron model may have a closed-form solution in continuous time and stable behavior including near attractors and saddle points. In other words, a useful neuron model is one that is practical and that can be used to model rich, realistic and biologically-consistent behaviors, as well as be used to both engineer and reverse engineer neural circuits.

A neuron model may depend on events, such as an input arrival, output spike or other event whether internal or external. To achieve a rich behavioral repertoire, a state machine that can exhibit complex behaviors may be desired. If the occurrence of an event itself, separate from the input contribution (if any), can influence the state machine and constrain dynamics subsequent to the event, then the future state of the system is not only a function of a state and input, but rather a function of a state, event, and input.

In an aspect, a neuron n may be modeled as a spiking leaky-integrate-and-fire neuron with a membrane voltage $v_n(t)$ governed by the following dynamics:

$$\frac{dv_n(t)}{dt} = \alpha v_n(t) + \beta \sum_m w_{m,n} y_m(t - \Delta t_{m,n}), \quad (2)$$

where $\alpha$ and $\beta$ are parameters, $w_{m,n}$ is a synaptic weight for the synapse connecting a presynaptic neuron m to a postsynaptic neuron n, and $y_m(t)$ is the spiking output of the neuron m that may be delayed by dendritic or axonal delay according to $\Delta t_{m,n}$ until arrival at the neuron n's soma.

It should be noted that there is a delay from the time when sufficient input to a postsynaptic neuron is established until the time when the postsynaptic neuron actually fires. In a dynamic spiking neuron model, such as Izhikevich's simple model, a time delay may be incurred if there is a difference between a depolarization threshold $v_t$ and a peak spike voltage $v_{peak}$. For example, in the simple model, neuron soma dynamics can be governed by the pair of differential equations for voltage and recovery, i.e.:

$$\frac{dv}{dt} = (k(v-v_t)(v-v_r) - u + I)/C, \quad (3)$$

$$\frac{du}{dt} = a(b(v-v_r) - u). \quad (4)$$

where v is a membrane potential, u is a membrane recovery variable, k is a parameter that describes time scale of the membrane potential v, a is a parameter that describes time scale of the recovery variable u, b is a parameter that describes sensitivity of the recovery variable u to the subthreshold fluctuations of the membrane potential v, $v_r$ is a membrane resting potential, I is a synaptic current, and C is a membrane's capacitance. In accordance with this model, the neuron is defined to spike when $v > v_{peak}$.

Hunzinger Cold Model

The Hunzinger Cold neuron model is a minimal dual-regime spiking linear dynamical model that can reproduce a rich variety of neural behaviors. The model's one- or two-dimensional linear dynamics can have two regimes, wherein the time constant (and coupling) can depend on the regime. In the sub-threshold regime, the time constant, negative by convention, represents leaky channel dynamics generally acting to return a cell to rest in a biologically-consistent linear fashion. The time constant in the supra-threshold regime, positive by convention, reflects anti-leaky channel dynamics generally driving a cell to spike while incurring latency in spike-generation.

Figure 4:
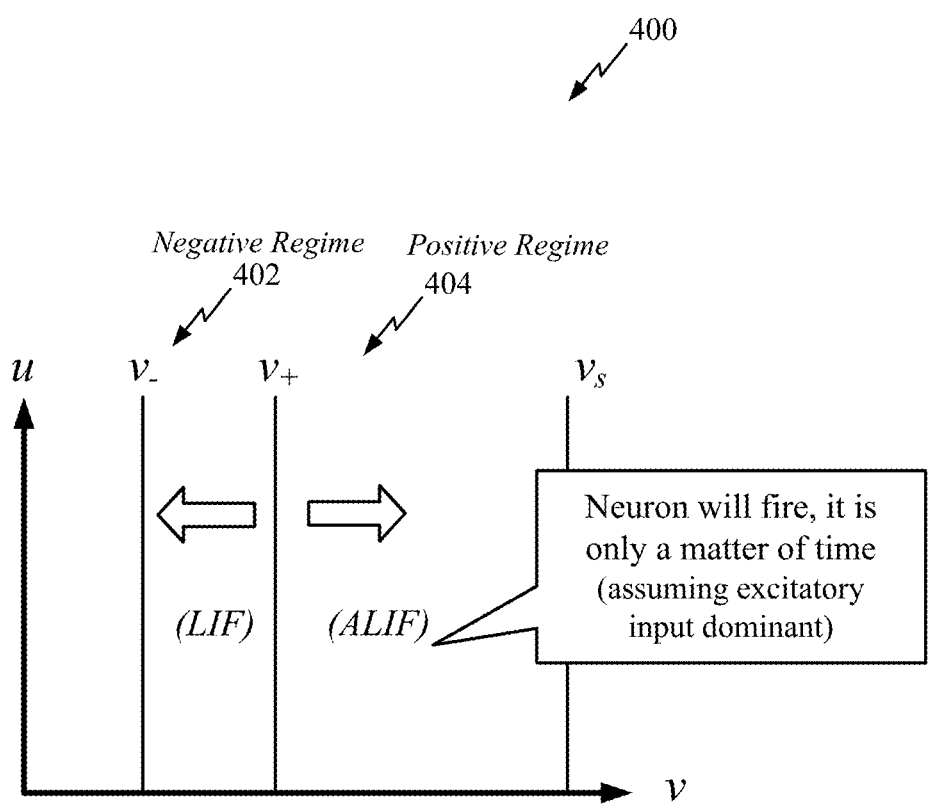
FIG. 4 illustrates an example of a positive regime and a negative regime for defining behavior of a neuron model in accordance with certain aspects of the present disclosure.

As illustrated in FIG. 4, the dynamics of the model 400 may be divided into two (or more) regimes. These regimes may be called the negative regime 402 (also interchangeably referred to as the leaky-integrate-and-fire (LIF) regime, not to be confused with the LIF neuron model) and the positive regime 404 (also interchangeably referred to as the anti-leaky-integrate-and-fire (ALIF) regime, not to be confused with the ALIF neuron model). In the negative regime 402, the state tends toward rest ($v_-$) at the time of a future event. In this negative regime, the model generally exhibits temporal input detection properties and other sub-threshold behavior. In the positive regime 404, the state tends toward a spiking event ($v_s$). In this positive regime, the model exhibits computational properties, such as incurring a latency to spike depending on subsequent input events. Formulation of dynamics in terms of events and separation of the dynamics into these two regimes are fundamental characteristics of the model.

Linear dual-regime bi-dimensional dynamics (for states v and u) may be defined by convention as:

$$\tau_\rho \frac{dv}{dt} = v + q_\rho \quad (5)$$

$$-\tau_u \frac{du}{dt} = u + r \quad (6)$$

where $q_\rho$ and r are the linear transformation variables for coupling.

The symbol ρ is used herein to denote the dynamics regime with the convention to replace the symbol ρ with the sign "−" or "+" for the negative and positive regimes, respectively, when discussing or expressing a relation for a specific regime.

The model state is defined by a membrane potential (voltage) v and recovery current u. In basic form, the regime is essentially determined by the model state. There are subtle, but important aspects of the precise and general definition, but for the moment, consider the model to be in the positive regime 404 if the voltage v is above a threshold ($v_+$) and otherwise in the negative regime 402.

The regime-dependent time constants include $\tau_-$ which is the negative regime time constant, and $\tau_+$ which is the positive regime time constant. The recovery current time constant $\tau_u$ is typically independent of regime. For convenience, the negative regime time constant $\tau_-$ is typically specified as a negative quantity to reflect decay so that the same expression for voltage evolution may be used as for the positive regime in which the exponent and $\tau_+$ will generally be positive, as will be $\tau_u$.

The dynamics of the two state elements may be coupled at events by transformations offsetting the states from their null-clines, where the transformation variables are:

$$q_\rho = -\tau_\rho \beta u - v_\rho \quad (7)$$

$$r = \delta(v + \varepsilon) \quad (8)$$

where δ, ε, β and $v_-$ $v_+$ are parameters. The two values for $v_\rho$ are the base for reference voltages for the two regimes. The parameter $v_-$ is the base voltage for the negative regime, and the membrane potential will generally decay toward $v_-$ in the negative regime. The parameter $v_+$ is the base voltage for the positive regime, and the membrane potential will generally tend away from $v_+$ in the positive regime.

The null-clines for v and u are given by the negative of the transformation variables $q_\rho$ and r, respectively. The parameter δ is a scale factor controlling the slope of the u null-cline. The parameter ε is typically set equal to $-v_-$. The parameter) β is a resistance value controlling the slope of the v null-clines in both regimes. The $\tau_\rho$ time-constant parameters control not only the exponential decays, but also the null-cline slopes in each regime separately.

The model may be defined to spike when the voltage v reaches a value $v_S$. Subsequently, the state may be reset at a reset event (which may be one and the same as the spike event):

$$v = \hat{v}_- \quad (9)$$

$$u = u + \Delta u \quad (10)$$

where $\hat{v}_-$ and $\Delta u$ are parameters. The reset voltage $\hat{v}_-$ is typically set to $v_-$.

By a principle of momentary coupling, a closed form solution is possible not only for state (and with a single exponential term), but also for the time required to reach a particular state. The close form state solutions are:

$$v(t + \Delta t) = (v(t) + q_\rho)e^{\frac{\Delta t}{\tau_\rho}} - q_\rho \quad (11)$$

$$u(t + \Delta t) = (u(t) + r)e^{-\frac{\Delta t}{\tau_u}} - r \quad (12)$$

Therefore, the model state may be updated only upon events, such as an input (presynaptic spike) or output (postsynaptic spike). Operations may also be performed at any particular time (whether or not there is input or output).

Moreover, by the momentary coupling principle, the time of a postsynaptic spike may be anticipated so the time to reach a particular state may be determined in advance without iterative techniques or Numerical Methods (e.g., the Euler numerical method). Given a prior voltage state $v_0$, the time delay until voltage state $v_f$ is reached is given by:

$$\Delta t = \tau_\rho \log \frac{v_f + q_\rho}{v_0 + q_\rho} \qquad (13)$$

If a spike is defined as occurring at the time the voltage state v reaches $v_S$, then the closed-form solution for the amount of time, or relative delay, until a spike occurs as measured from the time that the voltage is at a given state v is:

$$\Delta t_S = \begin{cases} \tau_+ \log \frac{v_S + q_+}{v + q_+} & \text{if } v > \hat{v}_+ \\ \infty & \text{otherwise} \end{cases} \qquad (14)$$

where $\hat{v}_+$ is typically set to parameter $v_+$, although other variations may be possible.

The above definitions of the model dynamics depend on whether the model is in the positive or negative regime. As mentioned, the coupling and the regime ρ may be computed upon events. For purposes of state propagation, the regime and coupling (transformation) variables may be defined based on the state at the time of the last (prior) event. For purposes of subsequently anticipating spike output time, the regime and coupling variable may be defined based on the state at the time of the next (current) event.

There are several possible implementations of the Cold model, and executing the simulation, emulation or model in time. This includes, for example, event-update, step-event update, and step-update modes. An event update is an update where states are updated based on events or "event update" (at particular moments). A step update is an update when the model is updated at intervals (e.g., 1 ms). This does not necessarily require iterative methods or Numerical methods. An event-based implementation is also possible at a limited time resolution in a step-based simulator by only updating the model if an event occurs at or between steps or by "step-event" update.

Dynamic Spatial Target Selection

Systems that are specified to take action on multiple targets, such as spatial targets, use various criteria for selecting one or more targets. The selection of a target may depend on a problem being solved. For example, one selection criterion uses the spatial relationship between targets and the object's current position. The function definition begins with a definition of the problem space. The decision function can execute continuously or can be gated by the presence of object instances.

In a conventional neural network based target selection, each area that a target might occupy may be associated with a node of a neural network, for example a neuron. The neuron will be connected to other neurons in the network via a set of weights that specifies a likelihood for selecting the area if that area is occupied by a target. That is, the weights may determine, along with other criteria such as the object's current position, the target to be chosen. In one example, the selection criterion selects the target closest to the object's current position. The nodes of the neural network may be considered abstractly as locations in memory that are written to a high value if a target occupies the associated location in space and written to a low value if no target occupies the associated location in space.

In some cases, it may be desirable to dynamically bias the selection toward or away from specific targets and/or areas. For example, after an object, such as a robot, visits a particular area and/or target, the area and/or target is biased to be less likely selected for a specific time period. In another example, the object, user, and/or network learn that high value targets tend to appear in a specific region, such as an upper left quadrant of space. Thus, in this example, the target selection may be biased toward the specific region.

Spatial locations can be represented with a two-dimensional (2D) grid of spiking cells. The location of each cell in the grid may be mapped to position in physical space. A property of the cell may be in dictated by the cell's activity, such as the spiking rate. In one configuration, an active cell indicates that the position is a target of interest. If an object includes a map of targets that is relative to the object's current position, one or more targets may be selected based on cross-inhibition. Selecting the target based on cross-inhibition may be referred to as winner-take-all. That is, the object selects one or more targets having an activity rate that is greater than the activity rate of other targets. In the present application, target cells and/or spatial regions may be referred to as targets.

In conventional target selection criterion, the weights of the cross-inhibitory connections are asymmetric when biasing the selection of the location. For example, in a conventional system, a location inhibits all locations that are farther from the object in comparison to the present location. In contrast, according to an aspect of the present disclosure, the selection process is dynamically biased. The bias may be referred to as focal attention.

That is, in one configuration, the selection criterion specifies a winner-take-all network that includes an attention map of space superimposed to bias selection toward specific regions. The bias may use cross-inhibitory connections that use an intermediate interneuron. In an unbiased conditions (i.e., no superimposed focus map), the interneuron relays the inhibition between cells. Still, the focus map may modify the excitability of the interneurons so that the interneurons are more or less likely to transmit the inhibitory impulses. Modifying excitability of the interneurons biases the winner take all computation.

Figure 5:
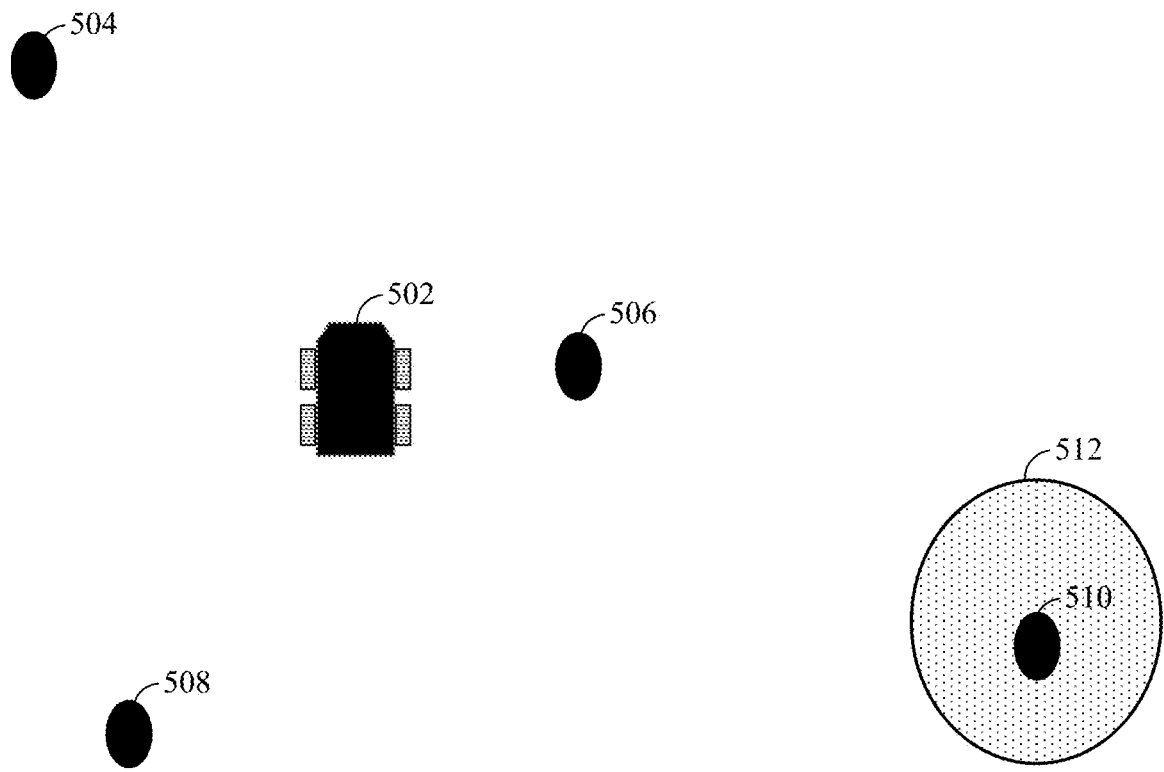
FIGS. 5 and 6 illustrate target selection according to aspects of the present disclosure.

FIG. 5 illustrates an example of target selection according to an aspect of the present disclosure. As shown in FIG. 5, targets 504, 506, 508, 510 surround an object 502. In a conventional system, the object 502 may be specified to select the second target 506 because the second target 506 is the closest target to the object 502. According to an aspect of the present disclosure, the area 512 near the fourth target 510 and/or the fourth target 510 itself are specified as being more desirable targets in comparison to the other targets 504, 506, 508 and/or other spatial areas (not shown). In one example, the area 512 near the fourth target 510 and/or the fourth target 510 are more desirable because the fourth target 510 is a high value target. In another example, the area 512 near the fourth target 510 and/or the fourth target 510 are more desirable because the object 502 has previously selected one of the other targets 504, 506, 508 and is specified to visit a new area for a predefined time period. Still, aspects of the present disclosure are not limited to the aforementioned reasons for the desirability of the specified area and/or target, of course, other reasons are contemplated for specifying specific targets and/or regions as being desirable.

Figure 6:
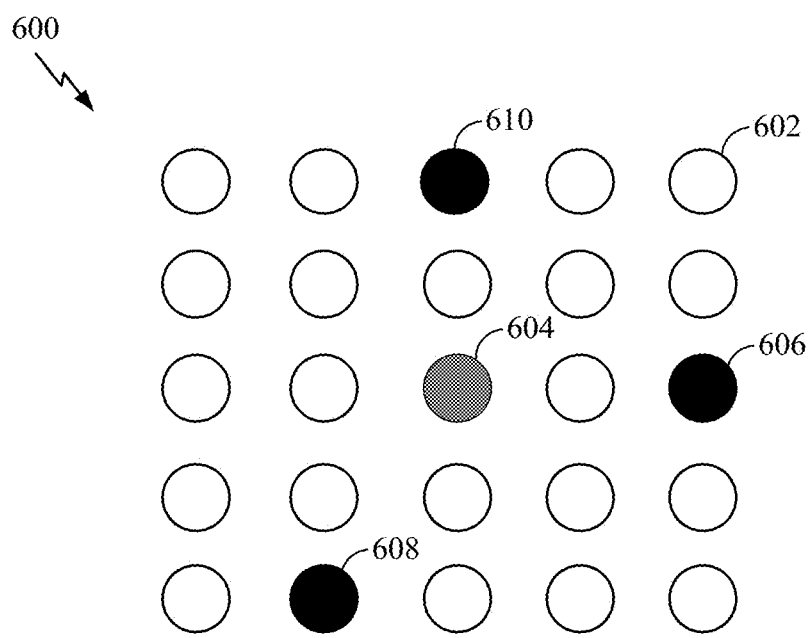

As shown in FIG. 6, target map 600 may be represented by a 2D grid of place cells 602. The presence of a target at a location is specified by an activity, such as a spiking interval, of a cell. In one configuration, it is assumed that the coordinates of the target(s) in the target map 600 have been transformed to be relative to the object's position.

Coordinate transformation refers to the conversion of a representation of space relative to a first reference frame to a substantially similar representation relative to a second reference frame. For example, an object, such as a robot, may be given a set of coordinates for a target relative to the northwest corner of a room. In this example, the coordinates for the target are based on a world-centric reference frame (i.e., allocentric coordinate representation). Still, for an object to plan a movement toward that target, it is desirable to convert the allocentric coordinates to a representation relative to the object's current position and direction (i.e., egocentric reference frame). That is, the allocentric coordinates should be converted to egocentric coordinates. The egocentric coordinates of the target would change as the object moved around the room, still, the allocentric coordinates would remain the same as the object moved around the room. It would be desirable to maintain the egocentric coordinates based on a fixed position for the object, such as a center of a map.

As shown in FIG. 6, the location of the object 604 is in the center of the target map 600. That is, in contrast to an allocentric map (not shown), the coordinates for the object 604 and the targets 606, 608, 610 in the target map 600 of FIG. 6 are based on a reference frame from the object's position.

In a conventional network, cross-inhibition is specified to allow one cell to spike at a rate that is greater than another cell. That is, when it is desired for one of the cells to be more likely to win, inhibitory weights may imbalance the bias for selection. For example, if one cell is closer to the object, then the inhibitory weights may bias the spiking of the other targets.

Figure 7:
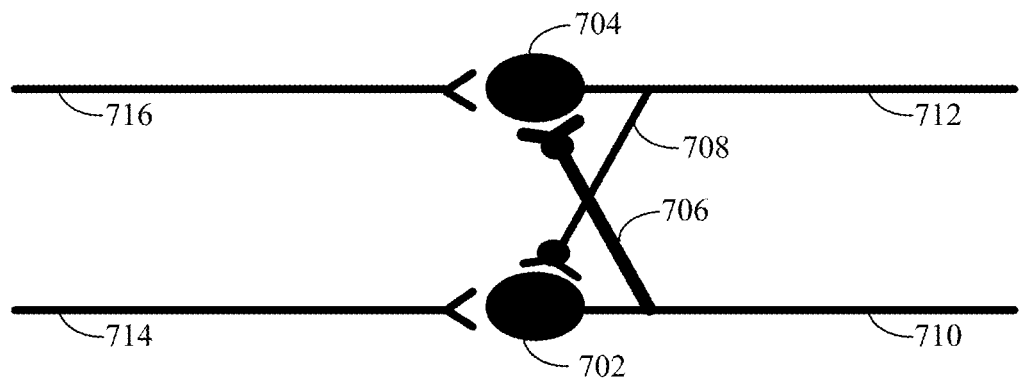
FIGS. 7 and 8 illustrate cross-inhibition according to aspects of the present disclosure.

FIG. 7 illustrates an example of cross-inhibition. As shown in FIG. 7, the first cell 702 inhibits the second cell 704 so the first cell 702 is more likely to win. That is, an inhibitory weight may be output via a first connection 706. The first connection 706 is connected to the output 710 of the first cell 702. A second connection 708 is also connected to the output 712 of the second cell 704. The second connection 708 may also output an inhibitory weight to the first cell 702. Still, in this configuration, the inhibitory weight of the first connection 706 is greater than the inhibitory weight of second connection 708. Therefore, the first cell 702 inhibits the second cell 704 so the first cell 702 is more likely to win. Furthermore, the first cell 702 receives a signal (e.g., spike) via a first input 714 and the second cell 704 receives a signal (e.g., spike) via a second input 716. In one configuration, the cross-inhibition allows only one cell to be more active than the other cell.

Figure 8:
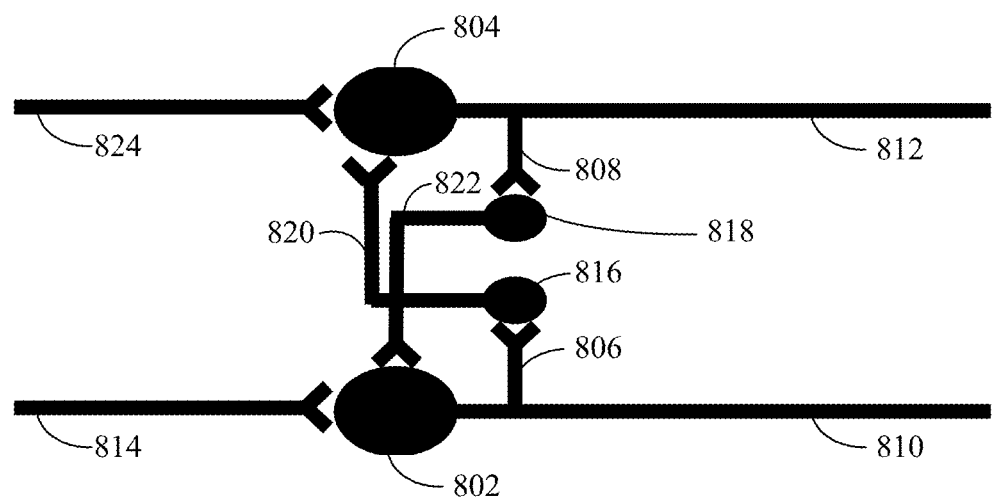

FIG. 8 illustrates an example of cross-inhibition according to an aspect of the present disclosure. As an example, in FIG. 8, the first cell 802 inhibits the second cell 804 so the first cell 802 is more likely to win. That is, an inhibitory weight may be output via a first connection 806. The first connection 806 is connected to the output 810 of the first cell 802 and a first interneuron 816 that inhibits the second cell 804 via a first interneuron connection 820. A second connection 808 is also connected to the output 812 of the second cell 804 and a second interneuron neuron 818 that inhibits the first cell 802 via a second interneuron connection 822. The second connection 808 may also output an inhibitory weight to the first cell 802. The first cell 802 receives an input via a first input 814 and the second cell 804 receives an input via a second input 824.

Still, in the present configuration, the interneurons 816, 818 mediate the inhibition. That is, the interneurons 816, 818 may further control the amount of cross-inhibition applied to a neuron, such as the first cell 802 or second cell 804. Specifically, the interneurons 816, 818 may dynamically modify the inhibitory weight and/or excitatory weight of a connection.

As an example, a first interneuron 816 is activated based on an input received via the first connection 806. In this example, the first interneuron 816 may increase or decrease the weight of inhibition based on the selection function. Accordingly, the dynamically modified weight is output to the second neuron 804 via the third connection 820. Moreover, the activity of the second neuron 804 is dynamically modified based on the input received via the third connection 820. Likewise, the activity of the first neuron 802 may be dynamically modified based on a dynamically modified weight received via the fourth connection 822.

It should be noted that the aforementioned connections are not limited to providing inhibitory weights. Aspects of the present disclosure are also contemplated for providing excitatory weights via the connections.

Figure 9:
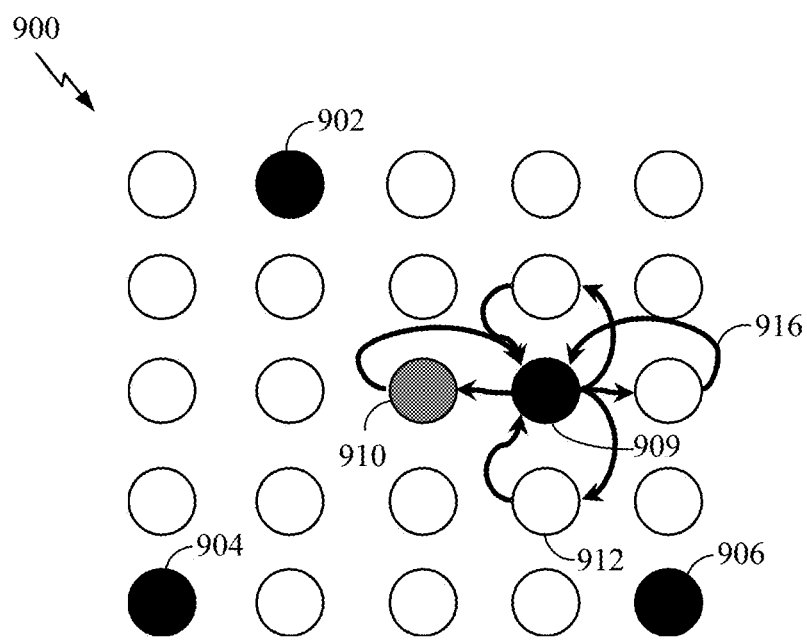
FIGS. 9-11 illustrate target selection according to aspects of the present disclosure.

As previously discussed, the aforementioned cross-inhibition may be applied to a two-dimension grid of cells. FIG. 9 illustrates an example of cross-inhibition for target selection in a target map 900. As previously discussed, in one configuration, a selection function is specified via relative scaling of the weights. That is, a specific cell in the two-dimensional grid may have an inhibitory effect on a second cell that is greater than the inhibitory effect of the second cell on the first.

In one configuration, the specific target is selected based on a selection function. The selection function may be dynamically modified by controlling the imbalance of connections between targets in a neural network. Each target may be associated with one or more neurons. Furthermore, in one configuration, the selection function is based on an inhibition on return, a behavioral state of an object that selects the target, a period of time, an assigned task, a time multiplexing function, and/or an event that selects a task from a set of tasks corresponding to a set of neural networks. Each task may correspond to a neural network and each neural network can be a static network or a dynamic network.

As an example, as shown in FIG. 9, a target 909 is selected based on the selection function. For example, the selected target 909 is selected because the region of the selected target 909 is a high value region. When a target is selected from the multiple targets, cells, such as the non-target cells 912, near the selected target 909 inhibit other cells, such as the non-selected target cells 902, 904, 906 and/or non-target cells 912, which are farther from the selected target 909. Furthermore, the object 910 and cells, such as non-target cells 912, near the selected target 909 may excite the selected target 909. That is, the activity of the non-selected target cells 902, 904, 906 is inhibited so the object 910 selects the selected target cell 909. In one configuration, multiple targets may be candidate targets, however, based on the cross-inhibition, only one target is an active target.

As discussed above, the spiking of a target is modified so that the object selects a specified target. In one configuration, the connections include inter-neurons defined on a connection between each pair of input and output neurons. Moreover, in the present configuration, the selection function is dynamically modified by modifying the excitability of the inter-neuron and/or modifying efficacy of synaptic weights between the inter-neuron and the input and output neurons. Alternatively, or in addition, the selection function is dynamically modified via an external input.

As previously discussed, in one configuration, the selection function is dynamically modified by modifying excitability of the neuron and/or modifying efficacy of synaptic weights. The synaptic weights may be weights for input synapses and/or connections between neurons. Furthermore, in one configuration, the amount of imbalance of connections in a neural network is based on inputs to the neural network and/or outputs from the neural network.

As shown in FIG. 9, the cells 909, 912, 910 may inhibit each other. For example, the selected target cell 909 inhibits the surrounding cells 912. Furthermore, the surrounding cells 912 may also inhibit or excite the selected target cell 909. Still, the inhibition output from the target cell 909 is greater than the inhibition received at the target cell 909 from the surrounding cells 912. The cells 909, 910, 912 provide inhibitory and/or excitatory outputs via connections 916.

FIG. 9 also shows the cells adjacent to the target cell 909 having inhibitory connections. Still, aspects of the present disclosure are not limited to inhibitory connections only being specified between cells and the inhibitory connections may be specified between cells of any distance.

As discussed above, in one configuration, an imbalance is set between connections in a neural network. The imbalance may be an inhibitory weight or an excitatory weight. The inhibitory weight decreases the spiking rate of a neuron and the excitatory weight increases the spiking of a neuron. The inhibitory weight may be provided via feed forward inhibitory connections and/or feedback inhibitory connections. Alternatively, or in addition to, the excitatory weight may be provided via feed forward inhibitory connections and/or feedback excitatory connections. The connection may be one or more first input layer connection, neuron inputs, lateral connections, and/or other type of connection. That is, in one configuration, the connection is an input to a neuron. Alternatively, or in addition, the connection is a lateral connection between neurons.

Furthermore, the imbalance is set based on a selection function, such as the distance of a target cell from an object. Still, the selection function is not limited to the distance of the target from the object and may be based on other criteria. For example, in another configuration, one or more targets are selected based on the probabilities of the targets. Each target may correspond to multiple active neurons or one active neuron. The probability may refer to spiking probability.

Moreover, in one configuration, a relative activation between neurons corresponding to candidate target cells is modified. The relative activation corresponds to one or more target cells and is based on the amount of imbalance between targets. The relative activation is specified so that one or more targets (e.g., neurons) have a greater amount of activity in comparison to other targets.

In one configuration, the targets are spatial targets. As previously discussed, one or more targets are selected based on an amount of imbalance provided via the connections between neurons. That is, the object selects the target with the highest activity, such as spiking rate. The targets may be one or more active neurons.

Figure 10:
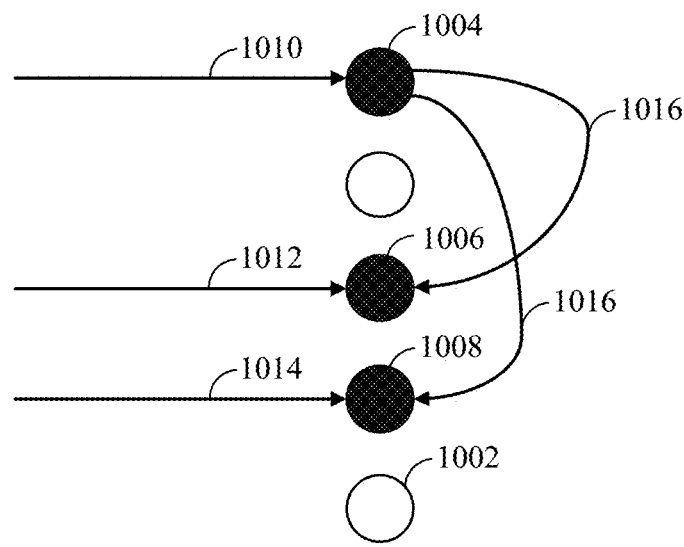

FIG. 10 illustrates an example of cross-inhibition according to an aspect of the present disclosure. As shown in FIG. 10, multiple neurons 1002 are specified and a set of the neurons are selected as targets 1004, 1006, 1008. Targets 1004, 1006, 1008 may be active (e.g., spike) based on received inputs 1010, 1012, 1014. As an example, based on selection criteria, the first target 1004 is more active than the other targets 1006, 1008. Thus, in this example, an object (not shown) would select the first target. Still, as another example, the first target 1004 may inhibit the activity of the other targets 1006, 1008 via inhibitory connections 1016. The inhibition may decrease or terminate the activity of the other targets 1006, 1008.

Figure 11:
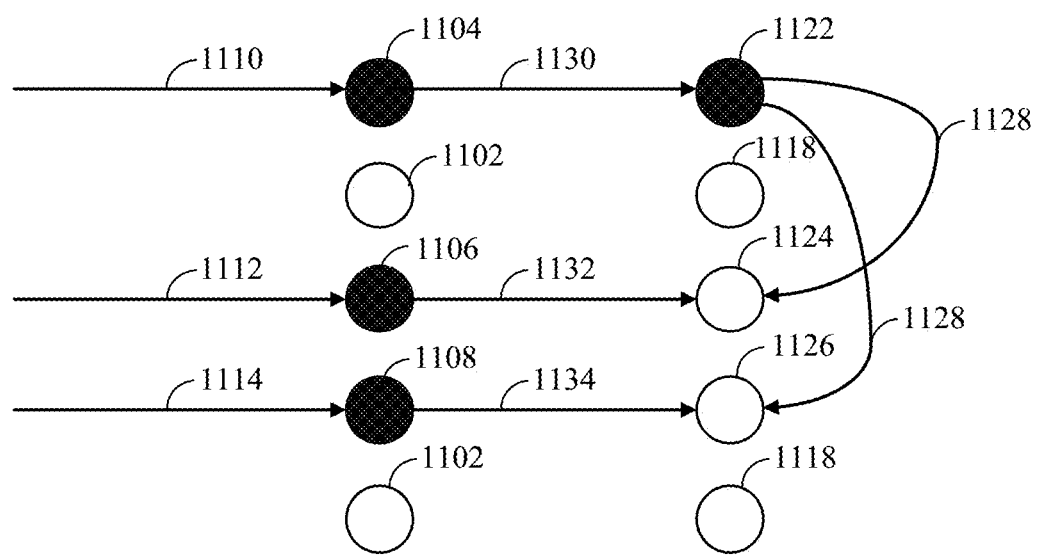

FIG. 11 illustrates an example of cross-inhibition according to another aspect of the present disclosure. As shown in FIG. 11, multiple neurons 1102 are specified and a set of the neurons are selected as targets 1104, 1106, 1108. Targets 1104, 1106, 1108 may be active (e.g., spike) based on received inputs 1110, 1112, 1114. As an example, based on selection criteria, the first target 1104 is more active than the other targets 1106, 1108. Thus, in this example, an object (not shown) would select the first target. Still, in one configuration, the neurons 1102 are specified for a first input layer and are connected to neurons 1118 of a second layer. Accordingly, a second layer neuron 1118 is active based on an input received from a first layer neuron 1102. In this configuration, the object selects the target associated with the active neuron(s) of the second layer.

In one configuration, second layer neurons 1118 include cross-inhibition connections to prevent other neurons from being active. That is, as shown in FIG. 11, the targets 1104, 1106, 1108 are all active based on received inputs 1110, 1112, 1114. As an example, based on selection criteria, the first target 1104 is more active than the other targets 1106, 1108. Still, the second layer target neurons 1122, 1124, 1126, corresponding the first layer target neurons 1104, 1106, 1108 are not all active because the first target neuron 1122 of the second layer inhibits the other second layer target neurons 1124, 1126 via inhibitory connections 1128 so that the other second layer target neurons 1124, 1126 do not become active. That is, even though the first layer target neurons are all active, only one second layer neuron is active due to the inhibitory connection. More specifically, based on the inhibition, the input received at the first layer is not represented and only an output of a selection criterion is represented. The first layer neurons may be connected to the second layer neurons via synapses 1130, 1132, 1134.

In one configuration, feed forward inhibition is specified on the synapses between the first layer neurons 1102 and the second layer neurons 1118. The feed forward inhibitory connection may be connected to neighboring neurons and inhibits neighboring neurons when a spike is received for a specific neuron. For example, in FIG. 11, an inhibitory connection (not shown) may be provided on each synapse 1130, 1132, 1134 between first layer target neurons 1104, 1106, 1108 and second layer target neurons 1122, 1124, 1126. Thus, as an example, when the first synapse 1130 receives a spike from the first target neuron 1104 of the first layer, the feed forward inhibitory connection inhibits the neighboring neurons of the first neuron 1122 of the second layer.

In another configuration, an interneuron is specified for the inhibitory connections between the second layer neurons. The interneuron specified for the inhibitory connections may be referred to as lateral inhibition. As an example, in FIG. 11, an interneuron (not shown) may be specified for each inhibitory connection 1128 between the first target neuron 1122 of the second layer and the other second layer target neurons 1124, 1126.

Connections, such as inhibitory connections, are not limited to first layer target neurons and the second layer target neurons, connections are also specified between all neurons in the first layer and second layer. Additionally, the aforementioned connections are not limited to inhibitory connections and are also contemplated as excitatory connections. Moreover, aspects of the present disclosure are contemplated for dynamically modifying the imbalance for any of the aforementioned connections in addition to other connections not expressly specified. Aspects of the present disclosure may reduce or eliminate the need to specify that inputs to neurons use randomly spaced spikes at a nominal frequency (i.e., Poisson firing) to achieve graded levels of excitability in the interneurons. Furthermore, in one configuration, a target may be associated with one or more neurons. For example, one neuron may represent one target. Alternatively, multiple neurons may represent one target.

In one configuration, multiple static and/or dynamic networks may be specified for dynamically modifying a selection function by controlling an amount of imbalance of connections in a neural network. That is, a first network may be specified to focus on a specific task and the first network controls an amount of imbalance of connections in a neural network to dynamically modify the selection function for the specific task. Moreover, a second network may be specified that uses some or all of the neurons of the first network. The task of the second network may be different from the task of the first network. Therefore, the second network controls an amount of imbalance of connections in a neural network to dynamically modify the selection function for the specific task of the second network. That is, the hardware specified for the target selection may be reused for different tasks based on the different networks. A task selector may be specified on the connections, such as inputs, outputs, or inter-neural connections to switch between specific tasks (e.g., networks).

In another configuration, a loop of logical functions is applied to the data. One example of a logical function loop is as follows:

```
while there is data
    if newdata is closer to object than currentWinner,
        replace currentWinner with newdata
```

In the present configuration, the run time of the loop is dependent on the amount of data being considered. Furthermore, in the present configuration, all of the data is assigned to memory elements. After assigning the data to memory elements, a selection function is performed by passing messages (e g, inhibition) between the memory elements. The present configuration has increased predictability for a run time regardless of how much data is considered. Furthermore, the present configuration reduces the amount of data that is processed by the compute engine.

As an example, for the present configuration, a set of objects is submitted to a selection function. Each object may be represented as a signal that is transmitted to one or more memory elements that are associated with that object. In one configuration, one memory location is specified to identify an object. Still, multiple memory locations may be simultaneously combined to define the identity of an object. For example, a target at position (4,5.5) may be represented by memory locations corresponding to (4,5) and (4,6).

The representation of each object instance may influence the representation of other object instances in the memory array. The influence exerted between the representations of object instances may be transmitted via connections between the object instances. The signal associated with one object instance may influence the targets of signals associated with other object instances (i.e., feed-forward inhibition). Moreover, the value of a target of the signal may also influence the targets of other signals directly (i.e., lateral inhibition). Additionally, the value of a target of a signal may modify a separate memory element that further influences the targets of other input signals (i.e., lateral inhibition with an interneuron). Finally, the signal associated with one object instance may modify a separate memory element that influences the targets of other input signals (i.e., feed-forward inhibition with an interneuron).

In one configuration, the memory element make be a neuron in a neural network. Additionally, in a spiking neural network, the memory element is a neuron in an active state that emits spikes at an increased rate in comparison to baseline. Moreover, in a rate-based neural network, the memory element is a neuron with a continuous activity level that is a based on inputs of the memory element.

In one configuration, the selection function is defined based on a specification of weights between memory elements by which the activity level in one element influences the activity level in other elements. When the sphere of influence of each memory element is restricted in space, the overall computation may be parallelized and may have increased performance in comparison to serialized computation.

Figure 12:
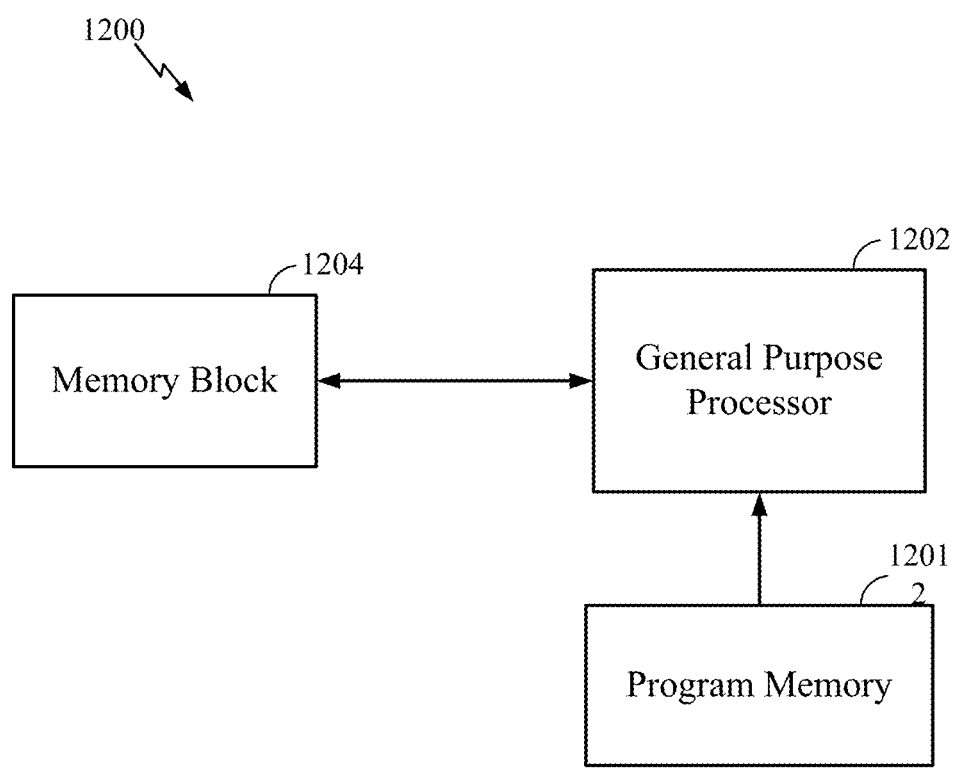
FIG. 12 illustrates an example implementation of designing a neural network using a general-purpose processor in accordance with certain aspects of the present disclosure.

FIG. 12 illustrates an example implementation 1200 of the aforementioned target selection using a general-purpose processor 1202 in accordance with certain aspects of the present disclosure. Variables (neural signals), synaptic weights, system parameters associated with a computational network (neural network), delays, and frequency bin information may be stored in a memory block 1204, while instructions executed at the general-purpose processor 1202 may be loaded from a program memory 1206. In an aspect of the present disclosure, the instructions loaded into the general-purpose processor 1202 may comprise code for dynamically modifying a selection function by controlling an amount of imbalance of connections in a neural network.

Figure 13:
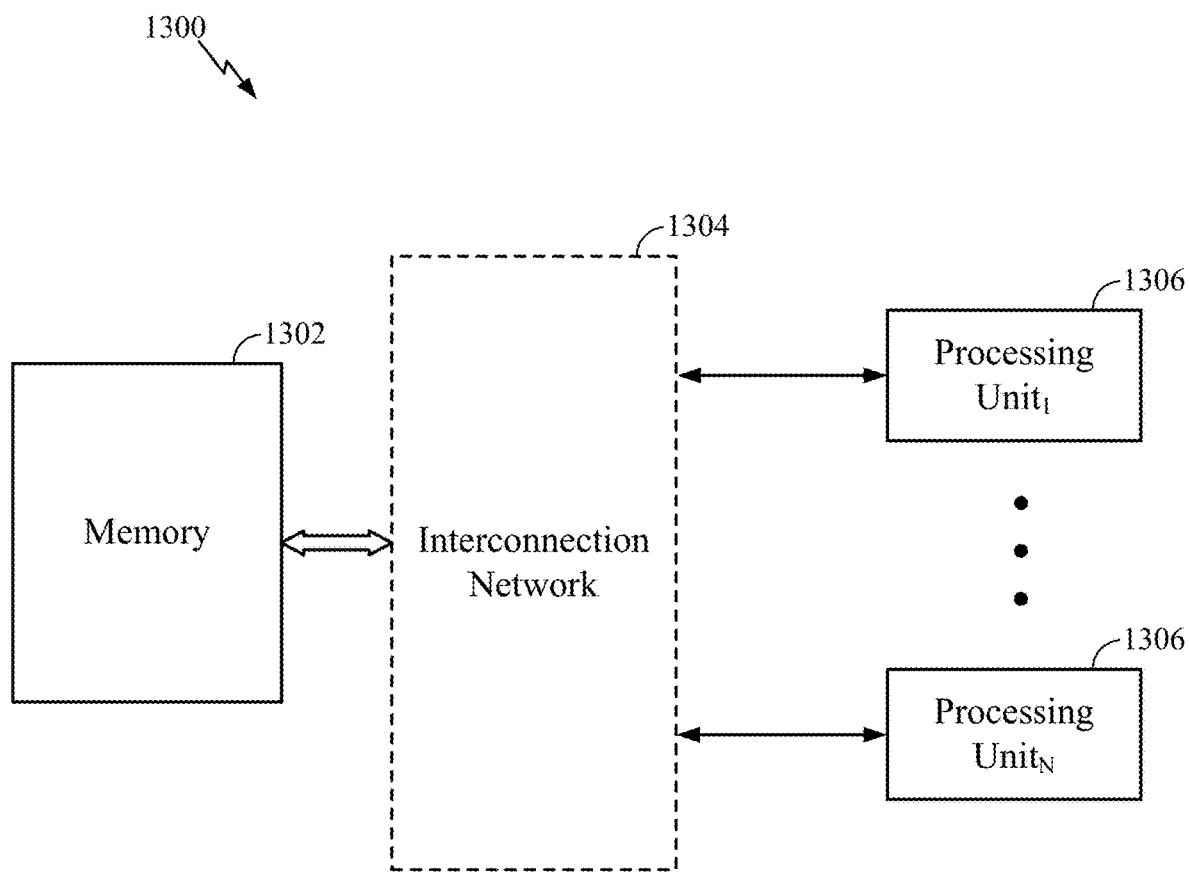
FIG. 13 illustrates an example implementation of designing a neural network where a memory may be interfaced with individual distributed processing units in accordance with certain aspects of the present disclosure.

FIG. 13 illustrates an example implementation 1300 of the aforementioned target selection where a memory 1302 can be interfaced via an interconnection network 1304 with individual (distributed) processing units (neural processors) 1306 of a computational network (neural network) in accordance with certain aspects of the present disclosure. Variables (neural signals), synaptic weights, system parameters associated with the computational network (neural network) delays, frequency bin information, connection imbalance, may be stored in the memory 1302, and may be loaded from the memory 1302 via connection(s) of the interconnection network 1304 into each processing unit (neural processor) 1306. In an aspect of the present disclosure, the processing unit 1306 may be configured to dynamically modify a selection function by controlling an amount of imbalance of connections in a neural network.

Figure 14:
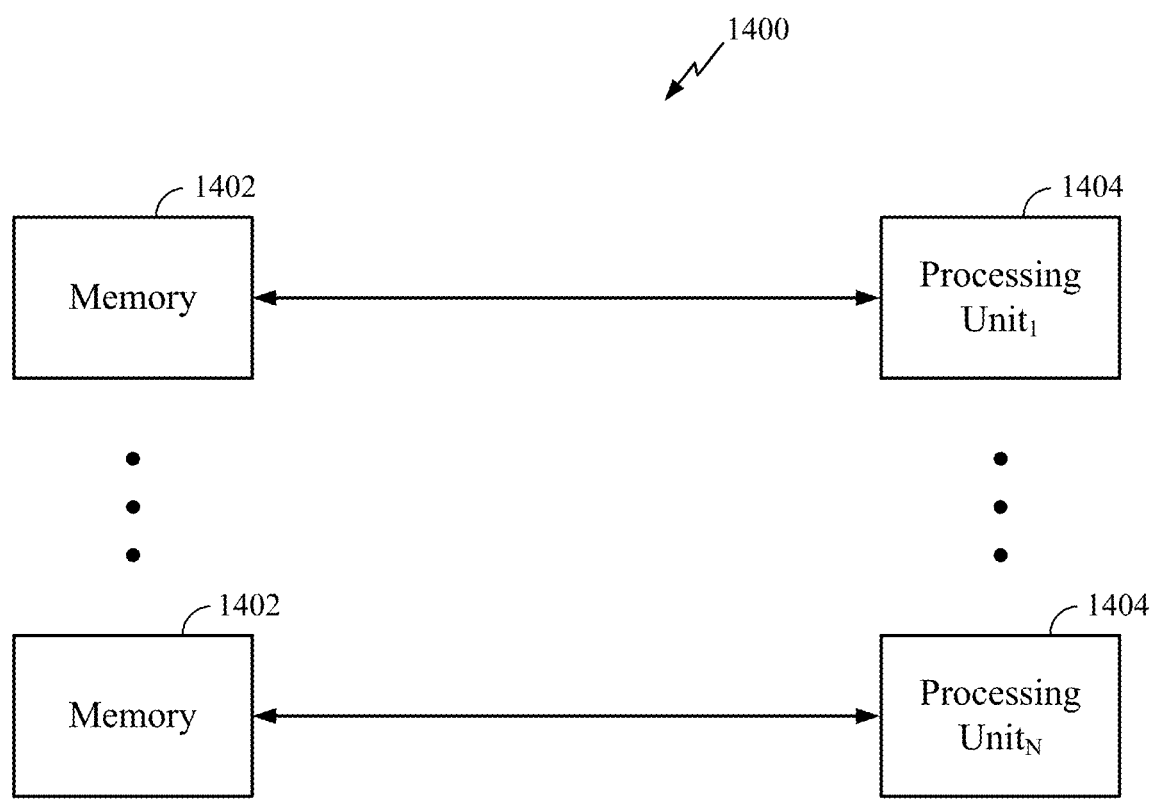
FIG. 14 illustrates an example implementation of designing a neural network based on distributed memories and distributed processing units in accordance with certain aspects of the present disclosure.

FIG. 14 illustrates an example implementation 1400 of the aforementioned target selection. As illustrated in FIG. 14, one memory bank 1402 may be directly interfaced with one processing unit 1404 of a computational network (neural network). Each memory bank 1402 may store variables (neural signals), synaptic weights, and/or system parameters associated with a corresponding processing unit (neural processor) 1404 delays, frequency bin information, and connection imbalance. In an aspect of the present disclosure, the processing unit 1404 may be configured to dynamically modify a selection function by controlling an amount of imbalance of connections in a neural network.

Figure 15:
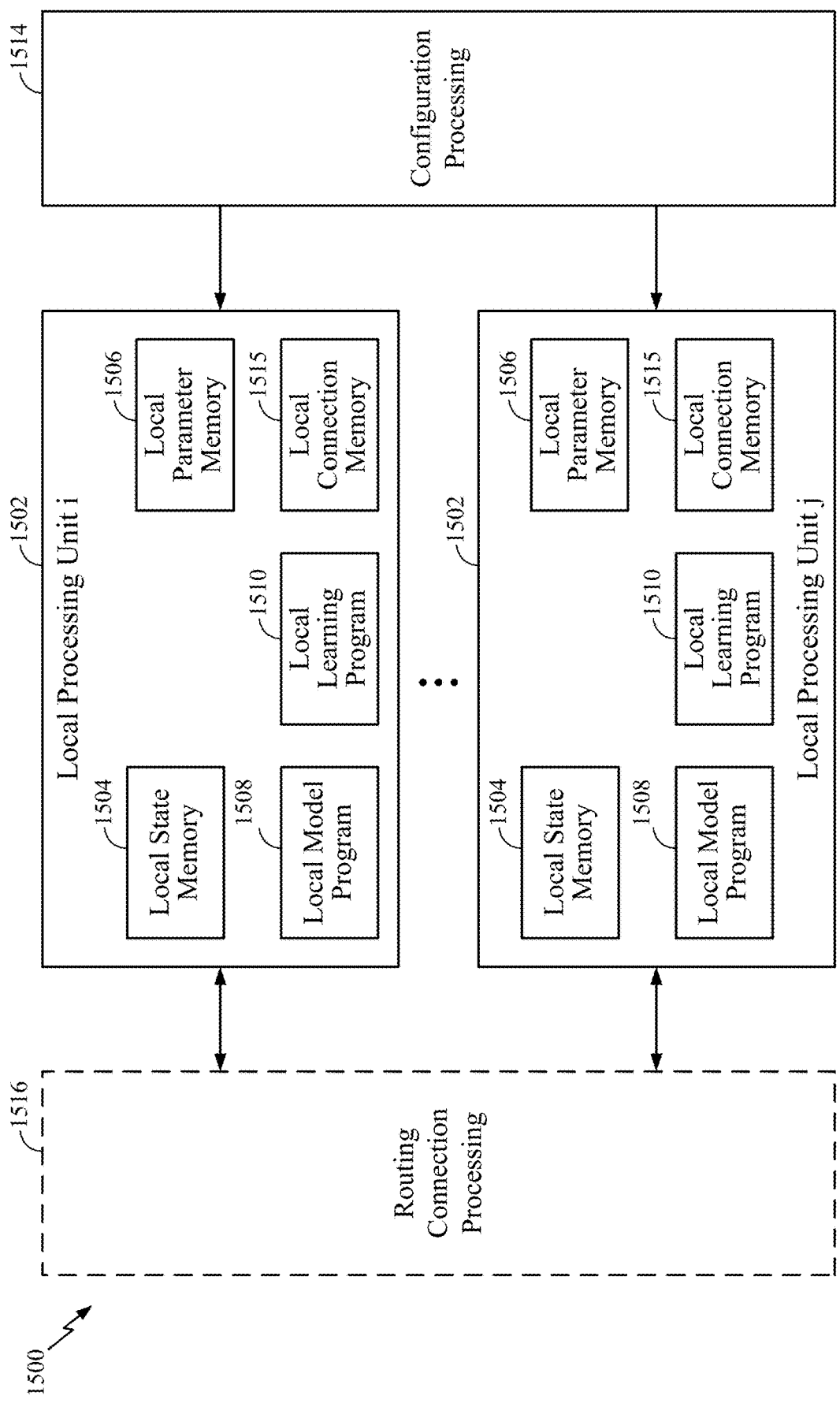
FIG. 15 illustrates an example implementation of a neural network in accordance with certain aspects of the present disclosure.

FIG. 15 illustrates an example implementation of a neural network 1500 in accordance with certain aspects of the present disclosure. As illustrated in FIG. 15, the neural network 1500 may have multiple local processing units 1502 that may perform various operations of methods described above. Each local processing unit 1502 may comprise a local state memory 1504 and a local parameter memory 1506 that store parameters of the neural network. In addition, the local processing unit 1502 may have a local (neuron) model program (LMP) memory 1508 for storing a local model program, a local learning program (LLP) memory 1510 for storing a local learning program, and a local connection memory 1512. Furthermore, as illustrated in FIG. 15, each local processing unit 1502 may be interfaced with a configuration processing unit 1514 for providing configurations for local memories of the local processing unit, and with a routing connection processing unit 1516 that provide routing between the local processing units 1502.

In one configuration, a neuron model is configured for dynamically modifying a selection function by controlling an amount of imbalance of connections in a neural network. The neuron model includes a modifying means. In one configuration, the modifying means is the general-purpose processor 1202, program memory 1206, memory block 1204, memory 1302, interconnection network 1304, processing units 1306, processing unit 1404, local processing units 1502, and or the routing connection processing units 1516 configured to perform the functions recited. Additionally, the neuron model may include a means for determining. In one configuration the determining means is the general-purpose processor 1202, program memory 1206, memory block 1204, memory 1302, interconnection network 1304, processing units 1306, processing unit 1404, local processing units 1502, and or the routing connection processing units 1516 configured to perform the functions recited. In another configuration, the aforementioned means may be any module or any apparatus configured to perform the functions recited by the aforementioned means.

According to certain aspects of the present disclosure, each local processing unit 1502 may be configured to determine parameters of the neural network based upon desired one or more functional features of the neural network, and develop the one or more functional features towards the desired functional features as the determined parameters are further adapted, tuned and updated.

Figure 16:
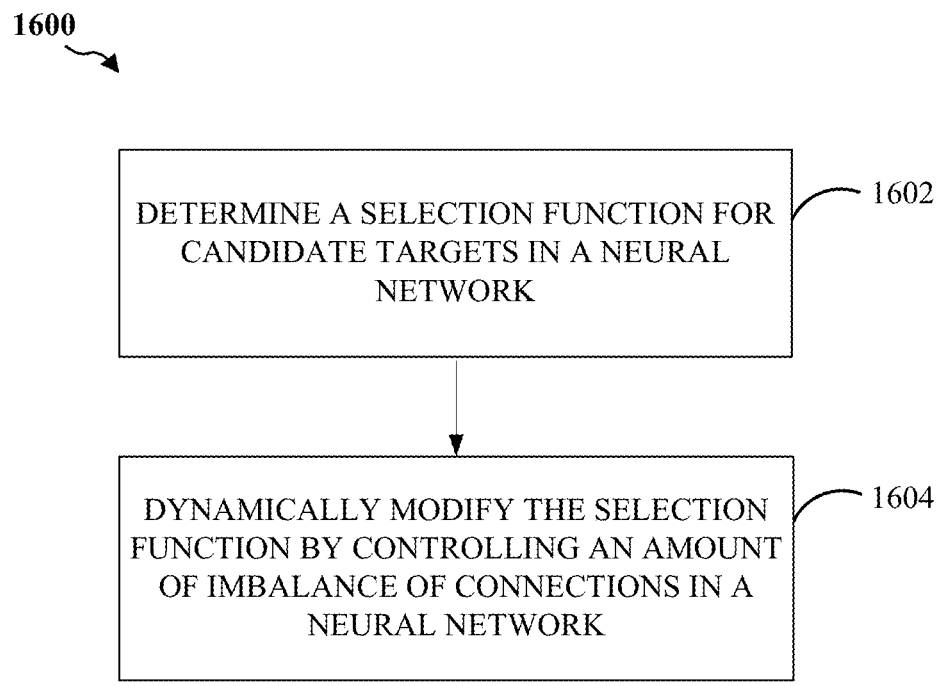
FIG. 16 is a block diagram illustrating selecting a target in a neural network in accordance with an aspect of the present disclosure.

FIG. 16 illustrates a method 1600 for selecting a target in a neural network. In block 1602, the neural network determines a selection function for candidate targets in a neural network. More specifically, the determining may be performed by the connections in the neural network. Furthermore, in block 1604 the neural network dynamically modifies the selection function by controlling an amount of imbalance of connections in a neural network. The selected neurons represent each candidate target. In one configuration, the focus map and/or external inputs are specified to dynamically modify the selection function.

The various operations of methods described above may be performed by any suitable means capable of performing the corresponding functions. The means may include various hardware and/or software component(s) and/or module(s), including, but not limited to, a circuit, an application specific integrated circuit (ASIC), or processor. Generally, where there are operations illustrated in the figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general-purpose processor may be a microprocessor, but in the alternative, the processor may be any commercially available processor, controller, microcontroller or state machine. A processor may also be implemented as a combination of computing devices (e.g., a combination of a DSP and a microprocessor, a plurality of microprocessors, one or more microprocessors in conjunction with a DSP core, or any other such configuration).

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, erasable programmable read-only memory (EPROM), electrically erasable programmable read-only memory (EEPROM), registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, random access memory (RAM), flash memory, read only memory (ROM), programmable read-only memory (PROM), erasable programmable read-only memory (EPROM), electrically erasable programmable Read-only memory (EEPROM), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or general register files. Although the various components discussed may be described as having a specific location, such as a local component, they may also be configured in various ways, such as certain components being configured as part of a distributed computing system.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described herein. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. In addition, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method of target selection with a neural network, comprising:
   mapping each target of a plurality of targets to a different location in a target map comprising a plurality of locations relative to a location of a robotic device in a spatial environment, each location represented by a neuron in the neural network;
   selecting a candidate target from the plurality of targets based on a target selection function of the robotic device;
   dynamically modifying, in response to selecting the candidate target, an amount of imbalance of connections to a candidate neuron representing a location corresponding to the candidate target, such that activity of the candidate neuron is greater than activity of neurons representing other locations, in which the imbalance is set by outputting inhibitory weights via connections from a target neuron of a plurality of neurons corresponding to a location of the selected target to non-target neurons of the plurality of neurons that do not correspond to the location of the selected target; and
   controlling the robotic device to move towards the candidate target based on activity of the candidate neuron.

2. The method of claim 1, in which the connections comprise inter-neurons coupled between the candidate neuron and neighboring neurons, and the dynamically modifying comprises at least dynamically modifying excitability of the inter-neurons, dynamically modifying efficacy of synaptic weights of connections corresponding to the inter-neurons, or a combination thereof.

3. The method of claim 2, in which the dynamically modifying comprises dynamically modifying with an external input.

4. The method of claim 1, in which the dynamically modifying comprises at least dynamically modifying excitability of the candidate neuron, dynamically modifying efficacy of synaptic weights, or a combination thereof.

5. The method of claim 4, in which the synaptic weights are for at least input synapses, connections between the candidate neuron and neighboring neurons, or a combination thereof.

6. The method of claim 1, in which the target selection function is based at least in part on an inhibition on return, a behavioral state of the robotic device that selects the candidate target, a period of time, an assigned task, a time multiplexing function, an event that selects a task from a plurality of tasks corresponding to a plurality of neural networks, or a combination thereof.

7. The method of claim 6, in which each task corresponds to one of the plurality of neural networks, and each neural network is a static network or a dynamic network.

8. The method of claim 1, further comprising controlling the amount of imbalance of connections based at least on inputs to the neural network, outputs from the neural network, or a combination thereof.

9. An apparatus for target selection with a neural network, the apparatus comprising:
   a memory unit; and
   at least one processor coupled to the memory unit, the at least one processor being configured:
      to map each target of a plurality of targets to a different location in a target map comprising a plurality of locations relative to a location of a robotic device in a spatial environment, each location corresponding to a neuron in the neural network;
      to select a candidate target from the plurality of targets based on a target selection function of the robotic device;
      to dynamically modify, in response to selecting the candidate target, an amount of imbalance of connections to a candidate neuron representing a location corresponding to the candidate target, such that activity of the candidate neuron is greater than activity of neurons representing other locations, in which the imbalance is set by outputting inhibitory weights via connections from a target neuron of a plurality of neurons corresponding to a location of the selected target to non-target neurons of the plurality of neurons that do not correspond to the location of the selected target; and
      to control the robotic device to move towards the candidate target based on activity of the candidate neuron.

10. The apparatus of claim 9, in which the connections comprise inter-neurons coupled between the candidate neuron and neighboring neurons, and the at least one processor being further configured to dynamically modify at least excitability of the inter-neurons, efficacy of synaptic weights of connections corresponding to the inter-neurons, or a combination thereof.

11. The apparatus of claim 10, in which the at least one processor is further configured to dynamically modify with an external input.

12. The apparatus of claim 9, in which the at least one processor is further configured to dynamically modify at least excitability of the candidate neuron, efficacy of synaptic weights, or a combination thereof.

13. The apparatus of claim 12, in which the synaptic weights are for at least input synapses, connections between the candidate neuron and neighboring neurons, or a combination thereof.

14. The apparatus of claim 9, in which the target selection function is based at least in part on an inhibition on return, a behavioral state of the robotic device that selects the candidate target, a period of time, an assigned task, a time multiplexing function, an event that selects a task from a plurality of tasks corresponding to a plurality of neural networks, or a combination thereof.

15. The apparatus of claim 14, in which each task corresponds to one of the plurality of neural networks, and each neural network is a static network or a dynamic network.

16. The apparatus of claim 9, in which the at least one processor is further configured to control the amount of imbalance of connections based at least on inputs to the neural network, outputs from the neural network, or a combination thereof.

17. An apparatus, the apparatus comprising:
   means for mapping each target of a plurality of targets to a different location in a target map comprising a plurality of locations relative to a location of a robotic device in a spatial environment, each location corresponding to a neuron in a neural network;
   means for selecting a candidate target from the plurality of targets based on a target selection function of the robotic device;
   means for dynamically modifying, in response to selecting the candidate target, an amount of imbalance of connections to a candidate neuron representing a location corresponding to the candidate target, such that activity of the candidate neuron is greater than activity of neurons representing other locations, in which the imbalance is set by outputting inhibitory weights via connections from a target neuron of a plurality of neurons corresponding to a location of the selected target to non-target neurons of the plurality of neurons that do not correspond to the location of the selected target; and
   means for controlling the robotic device to move towards the candidate target based on activity of the candidate neuron.

18. The apparatus of claim 17, in which the connections comprise inter-neurons coupled between the candidate neuron and neighboring neurons, and the means for dynamically modifying comprises means for dynamically modifying at least excitability of the inter-neurons, efficacy of synaptic weights of connections corresponding to the inter-neurons, or a combination thereof.

19. The apparatus of claim 18, in which the means for dynamically modifying comprises means for dynamically modifying with an external input.

20. The apparatus of claim 17, in which the means for dynamically modifying comprises means for dynamically modifying at least excitability of the candidate neuron, modifying efficacy of synaptic weights, or a combination thereof.

21. The apparatus of claim 20, in which the synaptic weights are for at least input synapses, connections between the candidate neuron and neighboring neurons, or a combination thereof.

22. The apparatus of claim 17, in which the target selection function is based at least in part on an inhibition on return, a behavioral state of the robotic device that selects the candidate target, a period of time, an assigned task, a time multiplexing function, an event that selects a task from a plurality of tasks corresponding to a plurality of neural networks, or a combination thereof.

23. The apparatus of claim 22, in which each task corresponds to one of the plurality of neural networks, and each neural network is a static network or a dynamic network.

24. The apparatus of claim 17, further comprising means for controlling the amount of imbalance of connections based at least on inputs to the neural network, outputs from the neural network, or a combination thereof.

25. A non-transitory computer-readable medium having non-transitory program code recorded thereon for target selection with a neural network, the program code comprising:
   program code to map each target of a plurality of targets to a different location in a target map comprising a plurality of locations relative to a location of a robotic device in a spatial environment, each location corresponding to a neuron in the neural network;
   program code to select a candidate target from the plurality of targets based on a target selection function of the robotic device;
   program code to dynamically modify, in response to selecting the candidate target, an amount of imbalance of connections to a candidate neuron representing a location corresponding to the candidate target, such that activity of the candidate neuron is greater than activity of neurons representing other locations, in which the imbalance is set by outputting inhibitory weights via connections from a target neuron of a plurality of neurons corresponding to a location of the selected target to non-target neurons of the plurality of neurons that do not correspond to the location of the selected target; and
   program code to control the robotic device to move towards the candidate target based on activity of the candidate neuron.

26. The non-transitory computer-readable medium of claim 25, in which the connections comprise inter-neurons coupled between the candidate neuron and neighboring neurons, and the program code further comprises program code to dynamically modify at least excitability of the inter-neurons, efficacy of synaptic weights of connections corresponding to the inter-neurons, or a combination thereof.

27. The non-transitory computer-readable medium of claim 26, in which the program code further comprises program code to dynamically modify with an external input.

28. The non-transitory computer-readable medium of claim 25, in which program code further comprises program code to dynamically modify at least excitability of the candidate neuron, efficacy of synaptic weights, or a combination thereof.

29. The non-transitory computer-readable medium of claim 28, in which the synaptic weights are for at least input synapses, connections between the candidate and neighboring neurons, or a combination thereof.

30. The non-transitory computer-readable medium of claim 25, in which the target selection function is based at least in part on an inhibition on return, a behavioral state of the robotic device that selects the candidate target, a period of time, an assigned task, a time multiplexing function, an event that selects a task from a plurality of tasks corresponding to a plurality of neural networks, or a combination thereof.

* * * * *